(12) United States Patent
Kim

(10) Patent No.: US 7,503,682 B2
(45) Date of Patent: Mar. 17, 2009

(54) BACKLIGHT UNIT

(75) Inventor: Yong Yun Kim, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 193 days.

(21) Appl. No.: 11/288,513

(22) Filed: Nov. 29, 2005

(65) Prior Publication Data

US 2006/0193119 A1    Aug. 31, 2006

(30) Foreign Application Priority Data

Feb. 28, 2005    (KR) ..................... 10-2005-0016503

(51) Int. Cl.
*F21V 7/04*    (2006.01)
(52) U.S. Cl. .................. 362/614; 362/611; 362/613; 362/630; 362/632; 362/633; 362/634
(58) Field of Classification Search ............... 362/614, 362/611, 613, 630, 632, 633, 634
See application file for complete search history.

(56) References Cited

U.S. PATENT DOCUMENTS 6,674,250 B2 * 1/2004 Cho et al. ................. 362/265
6,843,584 B2 * 1/2005 Bang et al. ................ 362/260
7,057,678 B2 * 6/2006 Ishida et al. .............. 362/225
7,061,465 B2 * 6/2006 Yajima et al. ............. 345/102
2006/0050202 A1 * 3/2006 Park et al. .................. 349/70

FOREIGN PATENT DOCUMENTS

JP    08082796 A   *  3/1996

\* cited by examiner

*Primary Examiner*—Ali Alavi
*Assistant Examiner*—William J Carter
(74) *Attorney, Agent, or Firm*—Brinks Hofer Gilson & Lione

(57) ABSTRACT

A backlight unit containing one or more light sources and fabrication method provided. Each light source has a tube with a first bent side connected to a first end and a second bent side connected to a second end. First and second electrodes are disposed on the tube between the bent sides and their corresponding ends. The backlight unit further includes a first plate having oppositely spaced edge regions. Each edge region has holes. A first portion of each light source is disposed above the first plate and a second portion of each light source is disposed below the first plate. The first and second common electrodes are electrically connected to the first and second electrodes disposed on the tube.

13 Claims, 2 Drawing Sheets

BACKLIGHT UNIT

This application claims the benefit of priority under 35 U.S.C. § 119 to Korean Patent Application No. 16503/2005, filed on Feb. 28, 2005.

BACKGROUND OF THE INVENTION

1. Field of the Invention

The present invention relates to a light source and to a backlight unit minimizing the presence of non-emitting regions.

2. Description of the Related Art

A liquid crystal display (LCD) device provides low power consumption and excellent color reproduction. However, because the liquid crystal panel displaying images in a LCD device does not emit light, an LCD device is a non-luminous display device. Accordingly, the LCD device requires a backlight unit disposed under the liquid crystal panel to irradiate light.

A fluorescent lamp can be used in a backlight unit. A glass tube in the fluorescent lamp is filled with mercury and inert gas, and an inner wall of the glass tube is coated with phosphors. Electrodes are disposed on both ends of the glass tube. Accordingly, when an electric field is applied to the electrodes, electrons are generated. As the electric field increases, electrons are accelerated within the glass tube. The accelerated electrons ionize mercury atoms. Ultraviolet (UV) rays are radiated by the ionized mercury atoms and light is generated through the phosphors.

The backlight units are classified as edge type backlight units or direct type backlight units depending on the location of the fluorescent lamp relative to the liquid crystal panel. An edge type backlight unit provides light to the side of a liquid crystal panel and is used for smaller LCD devices (e.g., portable phone, PDA, etc.). A direct type backlight unit directly provides light to the bottom of a liquid crystal panel and is used in medium- to large-size LCD devices (e.g., notebook computer, TV, etc.). A direct type backlight unit provides more brightness than an edge type backlight unit.

Fluorescent lamps may be classified as cold cathode fluorescent lamps (CCFLs) or external electrode fluorescent lamps (EEFLs) depending on location of their electrodes. Electrodes are embedded into the fluorescent lamp of a CCFL, but are disposed in the outside of the fluorescent lamp in an EEFL.

FIG. 1 is a sectional view of a related art EEFL. In this case, both ends of the glass tube 1 are sealed. First and second electrodes 4a and 4b are attached around the outer periphery of the glass tube 1 at each end.

In the EEFL depicted in FIG. 1, brightness and efficiency can be optimized by changing the length of the external electrodes depending on the length and diameter of the fluorescent lamp. With a longer EEFL, optimal lengths of the first and second external electrodes 4a and 4b will also be longer. Moreover, in a larger LCD, EEFLs tend to be longer and the external electrodes 4a and 4b tend to be lengthened.

The non-emitting A region corresponding to the EEFL depicted in FIG. 1 is particularly influenced by the lengths of the external electrodes 4a and 4b and by the size of the LCD device. Accordingly, as the size of the LCD device increases, there is a greater tendency for the first and second external electrodes 4a and 4b to be lengthened and for the non-emitting A region to be widened. Driver circuits, various lines, and external electrodes 4a and 4b are disposed in the non-emitting A regions. The non-emitting A regions are non-display regions, which are unable to display images. Accordingly, as the LCD device becomes larger in size and the non-emitting A regions are widened, the display region is reduced, resulting in decreased use efficiency of the LCD device.

SUMMARY OF THE INVENTION

The present invention is directed to a light source and a backlight unit containing the same, which obviate limitations and disadvantages in the related art. Accordingly, The present invention provides a light source minimizing non-emitting regions in the backlight unit of an LCD device.

In one aspect of the present invention, a light source is provided. The light source has a glass tube with a first bent side connected to a first end and a second bent side connected to a second end. First and second electrodes are disposed on the glass tube between the bent sides and their corresponding ends.

In another aspect, a backlight unit is provided having a first plate containing oppositely spaced edge regions. Each edge region has a plurality of holes. First and second common electrodes are disposed below the first plate. A plurality of light sources are provided, each light source has a glass tube with a first bent side connected to a first end and a second bent side connected to a second end. First and second electrodes are disposed on the glass tube between the bent sides and their corresponding ends. A first portion of each light source is disposed above the first plate and a second portion of each light source is disposed below the first plate. The first and second common electrodes are electrically connected to the first and second electrodes disposed on the glass tubes.

In another aspect, a method of making a backlight unit includes: providing a backlight unit with a first plate containing oppositely spaced edge regions, each edge region having a plurality of holes; disposing first and second common electrodes below the first plate; and providing the backlight unit with a plurality of light sources in accordance with the present invention; disposing a first portion of each light source is above the first plate and a second portion of each light source below the first plate; and electrically connecting the first and second common electrodes to the first and second electrodes disposed on the glass tubes.

In a further aspect, a method of preventing non-emitting regions from being determined by a light source in an LCD device includes providing an LCD device with a backlight unit containing light sources in accordance with the present invention and supplying a driving voltage so that a non-emitting region is not determined by the light sources.

The foregoing general description and the following detailed description of the present invention are exemplary and explanatory and are intended to provide further explanation of the claimed invention. Advantages, objects, and features of the invention will be apparent from the description which follows. Objectives and advantages of the present invention may be realized or attained using the embodiments exemplified in the specification, claims and appended drawings.

BRIEF DESCRIPTION OF THE DRAWINGS

The accompanying drawings illustrate aspects and principles of the present invention.

DETAILED DESCRIPTION OF THE INVENTION

Reference will now be made in detail to preferred embodiments of the present invention, examples of which are illustrated in the accompanying drawings. Wherever possible, the same reference numbers will be used throughout the drawings to refer to the same or like parts.

Figure 1:
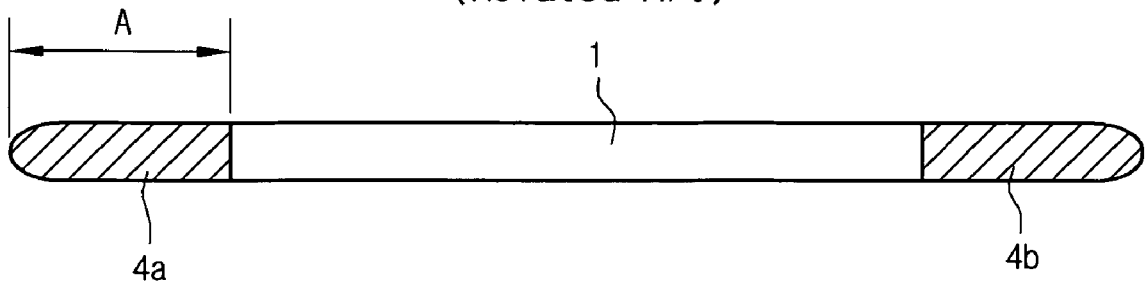
FIG. 1 is a sectional view of a related art EEFL.
Figure 2:
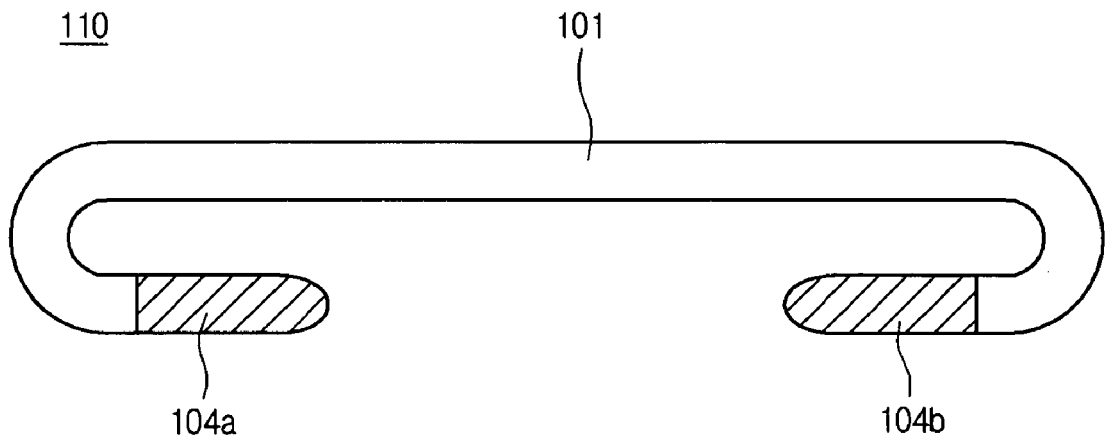
FIG. 2 is a sectional view of an EEFL according to an embodiment of the present invention.

FIG. 2 is a sectional view of an EEFL according to an embodiment of the present invention. In FIG. 2, the EEFL 110 includes a glass tube 101 and first and second external electrodes 104a and 104b. The glass tube 101 is filled with a discharge gas and an inner wall of the glass tube 101 is coated with phosphor. Each end of the glass tube 101 is bent in a curved C-shape. The first and second external electrodes 104a and 104b have a predetermined length and are attached to each of the curved C-shaped ends in the glass tube 101. Except for the region where the external electrodes 104a and 104b reside, the rest of the glass tube 101 serves as a complete light-emitting region.

Figure 3:
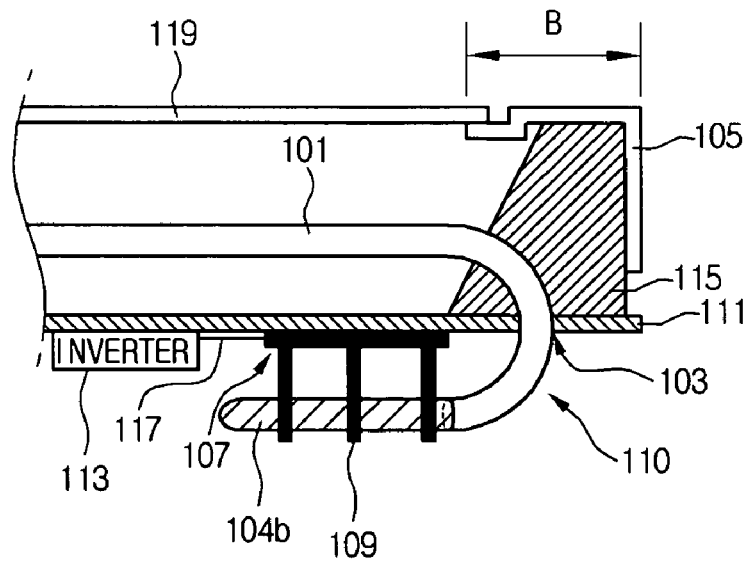
FIG. 3 is a partial sectional view of a backlight unit using the EEFL depicted in FIG. 2.

FIG. 3 is a partial sectional view of a direct type backlight unit employing the EEFL depicted in FIG. 2. In FIG. 3, light emitted from a plurality of EEFLs 110 is directly irradiated in a forward direction. The EEFLs 110 are fixed to a bottom case 111 with edge regions containing a plurality of holes 103 spaced apart at a predetermined distance from one another.

Toward each end of the bottom case 111, first and second common electrodes 107 are electrically connected to the first and second electrodes 104a and 104b in each EEFL 110. To the extent that the first and second electrodes 104a and 104b are outside of the bottom case 111 and light can be emitted from the portion of the EEFL tube inside the bottom case 111, the EEFL tube inside the bottom case fails to produce non-emitting regions.

A plurality of insertion holders 109 is integrally formed in the bottom case to electrically connect pairs of electrodes toward each end of an EEFL 110. Each insertion holder 109 has three elastic clips. In each insertion holder 109, three elastic clips open and close so as to secure the first and second electrodes 104a and 104b of the EEFL 110. The EEFLs 110 pass through holes 103 in the bottom case 111 and are connected to the insertion holders 109 of the first and second common electrodes 107 attached to the rear side of the bottom case 111. Thus, the insertion holders 109 for the first and second common electrodes 107 fix and electrically connect the EEFLs 110.

An inverter 113 helps generate a driving voltage for the EEFLs 110. The inverter 113 is attached to a rear side of the bottom case 111 and is spaced apart from the first and second common electrodes 107 by a predetermined distance. The inverter 113 and the first and second common electrodes 107 are electrically connected by a lamp wire 117. Accordingly, the driving voltage from the inverter 113 is applied to the first and second common electrodes 107 through the lamp wire 117 and then supplied to the first and second external electrodes 104a and 104b connected to insertion holders 109. In this manner, a predetermined light is generated.

Because the external electrodes 104a and 104b are thinner than the inverter 113, the thickness of the backlight unit is not changed, even when the external electrodes 104a and 104b are disposed on the rear side of the bottom case 111.

Since both sides of the EEFL 110 are bent, it may be difficult for the EEFL 110 to pass through the holes 103. Therefore, any suitable method for passing EEFLs through the bottom case 111 may be used. For example, the bottom case 111 may be divided into a plurality of portions, including divided bottom cases 111 coupled together after passing the EEFLs 110 through holes 103 in divided bottom case 111 portions.

In FIG. 3, supporter sides 115 are attached to edge regions toward each end the bottom case 111 so as to not plug the holes. Reflective plates (not shown) may be provided in the bottom of the bottom case 111 and in the inner side of the supporter sides 115 to reflect light emitted from the EEFLs 110. The reflective plates make the emitted light travel in a forward direction.

An optical sheet 119 is spaced from the EEFLs 110 at a predetermined distance. The optical sheet 119 controls emission of light in a forward direction from the EEFLs 110. Accordingly, the optical sheet 119 may include a diffusion sheet for diffusing light, a prism sheet for concentrating the diffused light to travel in parallel, and a protection sheet for protecting the diffusion sheet and the prism sheet. A panel guide member 105 fixed to the top of the supporter side 115 fixes the optical sheet 119.

Since the first and second external electrodes 104a and 104b of the EEFL 110 are disposed outside of the bottom case 111, non-emitting regions are not formed from the EEFL 110 disposed inside the bottom case 111. Accordingly, even though the LCD device may be larger and the first and second external electrodes 104a and 104b may be longer, non-emitting regions are not formed from EEFLs 110 inside the bottom case 111. By effectively removing non-emitting regions that would have been formed by the first and second external electrodes 104a and 104b according to the related art EEFL 1, display regions are effectively expanded.

Although a non-emitting B region may not be determined by EEFLs 110 in a backlight unit according to the present invention, non-emitting B regions may be determined by the width of the supporter side 115 and/or the panel guide member 105. Accordingly, non-emitting regions can be further reduced by narrowing the supporter side 115 and/or the panel guide member 105.

Figure 4:
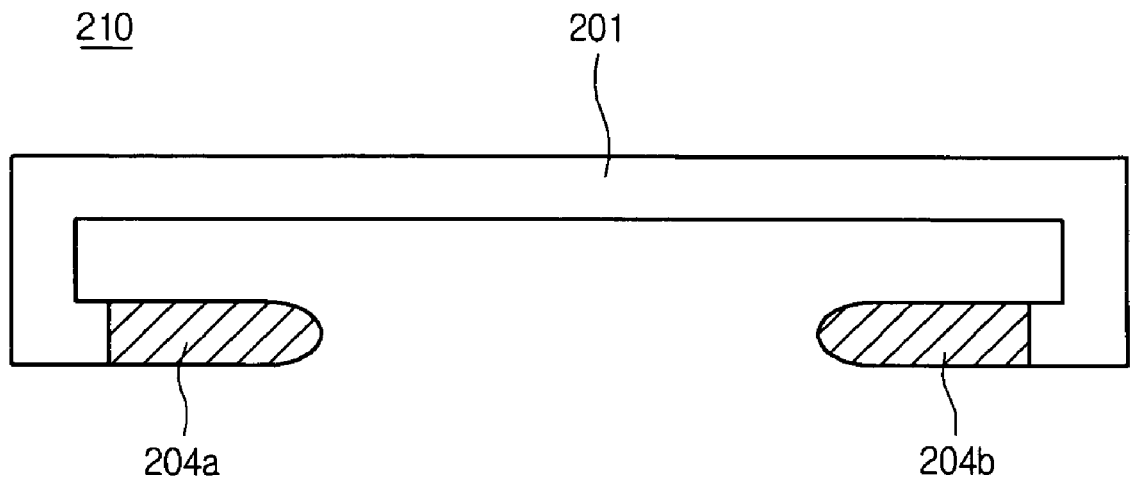
FIG. 4 is a sectional view of an EEFL according to another embodiment of the present invention.

FIG. 4 is a sectional view of an EEFL according to another embodiment of the present invention. In FIG. 4, the EEFL 210 includes a glass tube 201 and first and second external electrodes 204a and 204b. The glass tube 201 is filled with a discharge gas and an inner wall of the glass tube 201 is coated with phosphor. Each end of the glass tube 201 is bent in a rectangular C-shape. The first and second external electrodes 204a and 204b have a predetermined length and are attached to each of the rectangular C-shaped ends in the glass tube 201. Except for the region where the external electrodes 104a and 104b reside, the rest of the glass tube 101 serves as a complete light-emitting region.

Figure 5:
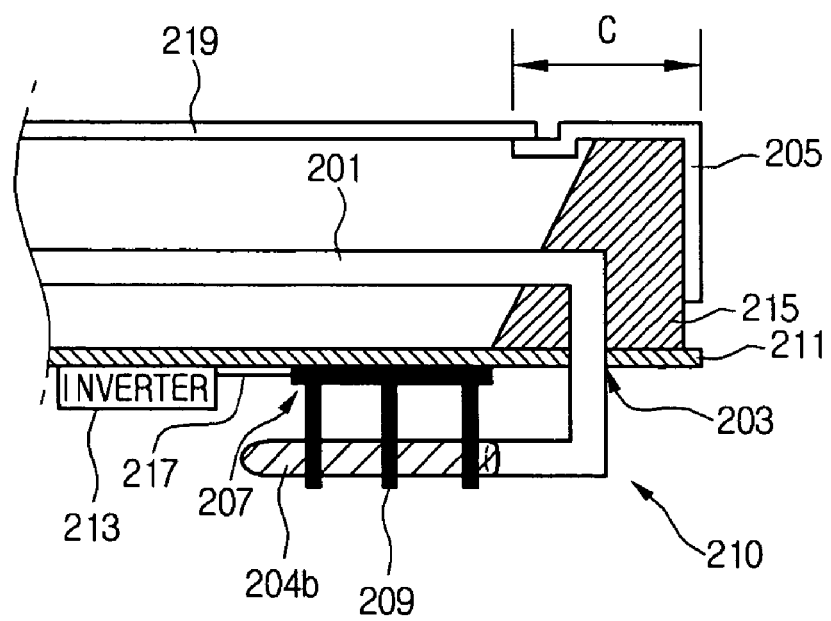
FIG. 5 is a partial sectional view of a backlight unit using the EEFL depicted in FIG. 4.

FIG. 5 is a partial sectional view of a backlight unit employing the EEFL depicted in FIG. 4. The backlight unit in FIG. 5 is similar to the background unit described in FIG. 3 and may employ similar or comparable elements described therein.

FIG. 5 depicts an EEFL 210 fixed to a bottom case 211. The direct type backlight unit depicted in FIG. 5 includes a plurality of EEFLs 210 spaced apart at a predetermined distance from one another. The EEFL 210 includes a glass tube 201 having an inner wall coated with phosphor. The first and second external electrodes 204a and 204b are attached to an outside of the glass tube 201 at each end.

A bottom case 211 includes two edge regions having plurality of holes 203. Each EEFL 210 passes through a pair of holes 203 in the bottom case 211. Because the bottom case 211 includes a plurality of paired holes 203, a plurality of EEFLs 210 can be disposed in the bottom case 211.

First and second common electrodes 207 are attached at a rear side toward each end of the bottom case 211, and are electrically connected to the first and second electrodes 204a and 204b in each EEFL 210. A plurality of insertion holders 209 are integrally formed toward each end of the bottom case to electrically connect external electrodes 204a and 204b with first and second common electrodes 207 corresponding thereto.

The first and second common electrodes 207 are electrically connected to an inverter 213 by a lamp wire 217. The inverter 213, attached to a rear side of the bottom case 211, is spaced apart from the first and second common electrodes 207.

In FIG. 5, supporter sides 215 are attached to edge regions toward each end of the bottom case 211 so as to not plug the holes. Reflective plates (not shown) may be provided in the bottom of the bottom case 211 and in the inner side of the supporter sides 215 so as to reflect light emitted from the EEFLs 210.

An optical sheet 219 is spaced from the EEFLs 210 at a predetermined distance. The optical sheet 219 controls emission of light in a forward direction from the EEFLs 210. A panel guide member 205 fixed to the top of the supporter side 215 fixes the optical sheet 219.

Since the first and second external electrodes 204a and 204b of the EEFL 210 are disposed outside of the bottom case 211, non-emitting regions are not formed from the glass tube 201 of EEFL 210 disposed inside the bottom case 211. Accordingly, even though the LCD device may be larger and the first and second external electrodes 204a and 204b may be longer, non-emitting regions are not formed from EEFLs 210 inside the bottom case 211. By effectively removing non-emitting regions that might have been formed by the first and second external electrodes 204a and 204b according to a related art EEFL 1, display regions are effectively expanded.

Although a non-emitting C region may not be determined by EEFLs 210 in a backlight unit according to the present invention, non-emitting C regions may be determined by the width of the supporter side 215 and/or the panel guide member 205. Accordingly, non-emitting regions can be further reduced by narrowing the supporter side 215 and/or the panel guide member 205.

In accordance with the present invention, the display region of the LCD device can be effectively expanded by precluding external electrodes from forming non-emitting regions. In particular, the present invention minimizes non-emitting regions by bending the EEFL and disposing the first and second external electrodes of the EEFL outside of the bottom case.

In related art EEFLs, electrode lengths increase and non-emitting regions widen as an LCD device becomes larger in size. When using the EEFLs of the present invention, however, display regions are not reduced when an LCD device increases in size. Accordingly, the display region improvement accompanying the present invention results in improved use efficiency in an LCD device.

It will be apparent to those skilled in the art that various modifications and variations can be made in the present invention. Thus, the present invention intends to cover such modifications and variations provided they come within the scope of the specification and the appended claims and their equivalents.

What is claimed is:
1. A light source comprising:
   a bottom cover formed in a plane and comprising oppositely spaced edge regions, each edge region of the bottom cover in a plane comprising a plurality of holes;
   first and second common electrodes attached to a rear surface of bottom cover around the holes, each common electrode comprising a plurality of insertion holders, and each insertion holder having a plurality of elastic clips;
   light sources, each light source comprising:
      a glass tube disposed on an upper surface of the bottom cover and comprising two ends, a two bent sides and a center portion, each of the two bent sides connected to a corresponding end, each bent side passing through each hole; and
   first and second electrodes disposed on the rear surface of the bottom cover and attached between the bent sides and their corresponding ends and are parallel and vertically in-line with the center portion;
   wherein each of the first and second electrodes is connected to the insertion holders.

2. The backlight unit of claim 1, further comprising an inverter below the bottom cover operatively disposed to supply a driving voltage to the first and second common electrodes.

3. The backlight unit of claim 2, wherein the inverter is spaced apart from the first and second common electrodes at a predetermined distance.

4. The backlight unit of claim 1, further comprising:
   an optical sheet spaced apart from the plurality of light sources at a predetermined distance and operatively positioned to control emission of light from the light sources;
   first and second supporter sides disposed on both edge regions of the bottom cover; and
   first and second guide members operatively disposed on the first and second supporter sides to fix the optical sheet.

5. The backlight unit of claim 4, wherein the first and second supporter sides does not plug the holes.

6. The backlight unit of claim 1, wherein each of the bent sides is bent in a curved C-shape.

7. The backlight unit of claim 1, wherein each of the bent sides is bent in a rectangular C-shape.

8. The backlight unit of claim 1, wherein each of the bent sides passes through a hole in an edge region of the bottom cover.

9. The backlight unit of claim 1, wherein the light sources are configured in the backlight unit so that non-emitting regions are not formed by the light sources.

10. The backlight unit of claim 1, wherein the light source is an external electrode fluorescent lamp.

11. The backlight unit of claim 1, wherein a non-emitting region is determined by a width of the first and second supporter sides.

12. The backlight unit of claim 1, wherein a non-emitting region is determined by a width of the first and second guide members.

13. A method of making a backlight unit comprising:
   providing a backlight unit with a bottom cover in a plane and comprising oppositely spaced edge regions, each edge region of the bottom cover in a plane comprising a plurality of holes;
   attaching first and second common electrodes to a rear surface of the bottom cover around the holes, each common electrode comprising a plurality of insertion holders, and each insertion holder having a plurality of elastic clips; and providing the backlight unit with a plurality of light sources, each light source comprising:

a glass tube disposed on an upper surface of the bottom cover and comprising two ends, two bent sides, each of the two bent sides connected to a corresponding end, each bent side and a center portion, each hole; and first and second electrodes disposed on the rear surface of the bottom cover and attached between the bent sides and their corresponding ends, and are parallel and vertically in-line with the center portion; and electrically connecting each of the first and second electrodes to the insertion holders.

* * * * *

UNITED STATES PATENT AND TRADEMARK OFFICE
CERTIFICATE OF CORRECTION

PATENT NO. : 7,503,682 B2 Page 1 of 1
APPLICATION NO. : 11/288513
DATED : March 17, 2009
INVENTOR(S) : Yong Yun Kim It is certified that error appears in the above-identified patent and that said Letters Patent is hereby corrected as shown below:

In the Claims

In column 5, claim 1, line 67, before "comprising" replace "light source" with --backlight unit--.

In column 6, claim 1, line 11, after "comprising two ends," delete "a".

In column 7, claim 13, line 4, after "ends, two bent" replace "sides," with --sides and a center portion,--.

In column 7, claim 13, line 6, after "each bent side" replace "and a center portion," with --passing through--.

In column 8, claim 13, line 3, immediately after "corresponding ends" delete ",".

Signed and Sealed this

First Day of December, 2009

David J. Kappos
*Director of the United States Patent and Trademark Office*